United States Patent [19]

Meffert et al.

[11] Patent Number: 4,986,800

[45] Date of Patent: Jan. 22, 1991

[54] FOUR-WHEEL LOCKING SYSTEM FOR A MOTOR VEHICLE

[75] Inventors: Peter Meffert; Heinrich Schwarz, both of Tiefenbronn; Juergen Patzer, Neckartailfingen, all of Fed. Rep. of Germany

[73] Assignee: Dr. Ing. h.c.F. Porsche AG

[21] Appl. No.: 363,143

[22] Filed: Jun. 8, 1989

[30] Foreign Application Priority Data

Jun. 9, 1988 [DE] Fed. Rep. of Germany ....... 3819703

[51] Int. Cl.$^5$ .............................................. F16H 3/44
[52] U.S. Cl. ...................................... 475/113; 475/249
[58] Field of Search ................... 475/84, 89, 104, 113, 475/249

[56] References Cited

U.S. PATENT DOCUMENTS

| 4,520,691 | 6/1985 | Rodler, Jr. | 475/113 |
| 4,691,593 | 9/1987 | Mueller | 475/113 |
| 4,831,890 | 5/1989 | Valentin et al. | 475/249 |

FOREIGN PATENT DOCUMENTS 3507490 3/1986 Fed. Rep. of Germany.

OTHER PUBLICATIONS

Prof. Dr.-Ing. K. Roth, "Stirnradpaarunger mit 1-bis 5-zährigen Ritzeln im Maschinenbau", (1974), pp. 425–429.

H.-Chr. Graf V. Seherr-Thoss, "DieEntwicklung der Zahnrad-Technik", (1965), p. 482.

Primary Examiner—Dirk Wright
Attorney, Agent, or Firm—Evenson, Wands, Edwards, Lenahan & McKeown

[57] ABSTRACT

In the drive line of a motor vehicle, a planetary transmission is arranged as four-wheel locking system, a braking device acting upon the planet carrier of this planetary transmission. The planetary transmission includes an input sun gear, an output sun gear disposed coaxially next to it, and planet wheels mating simultaneously with both sun gears. In order to keep friction losses low and avoid a self-locking in the planetary transmission, the real pitch module of all gear wheels is as small as possible and proportional to the driving torque to be transmitted, and the operational pressure angle is as large as possible.

5 Claims, 5 Drawing Sheets

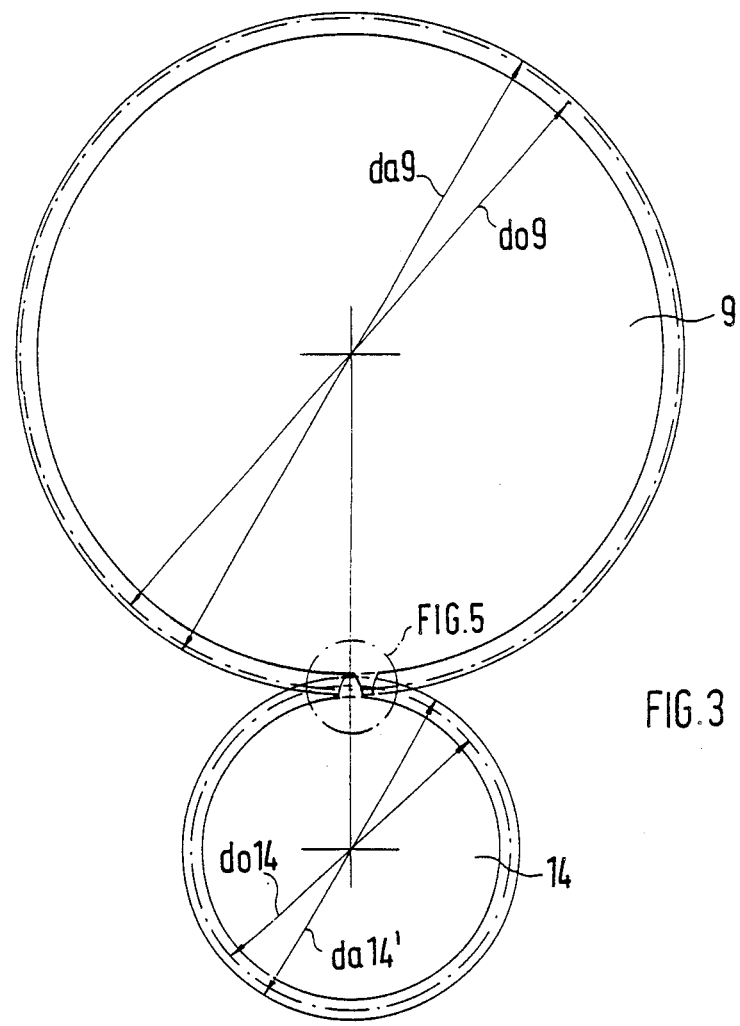

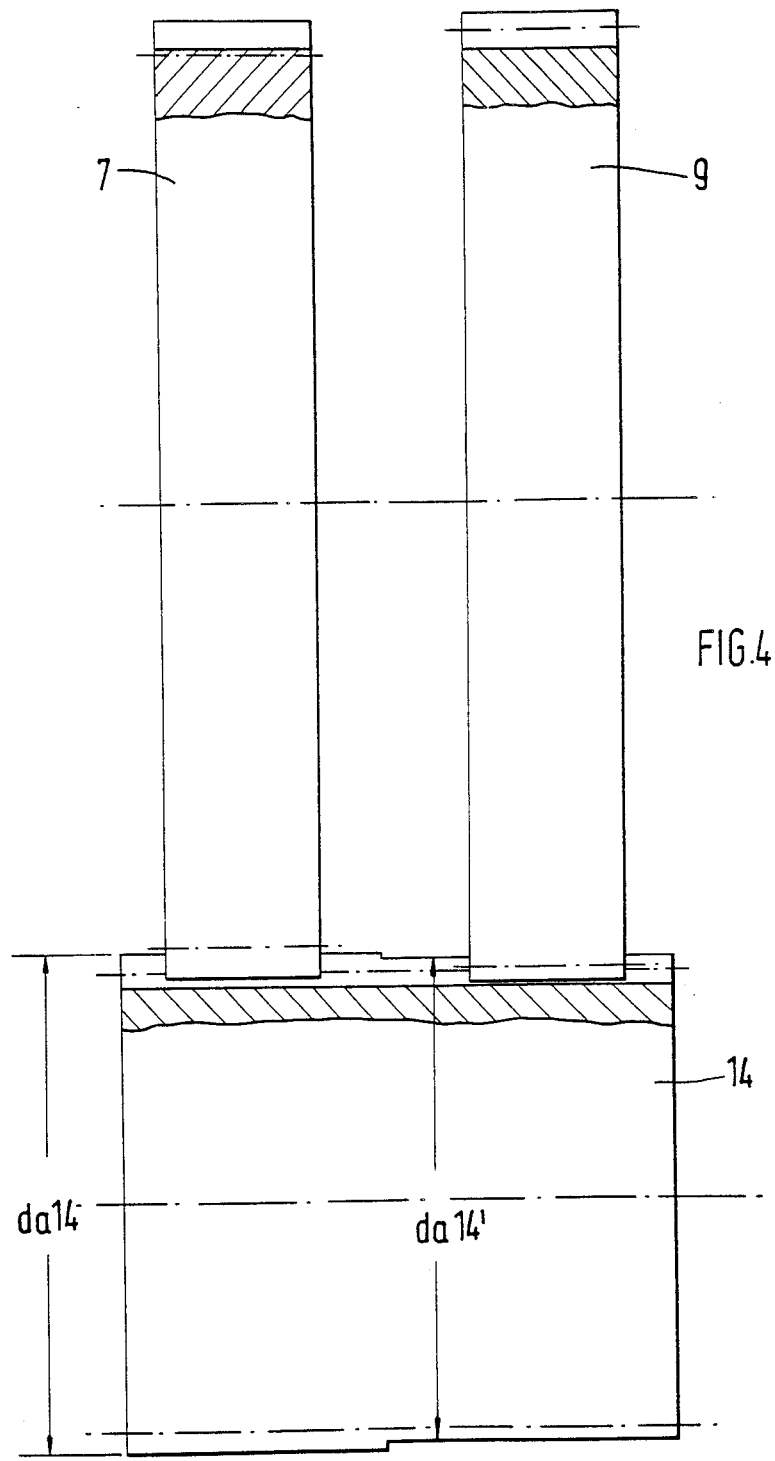

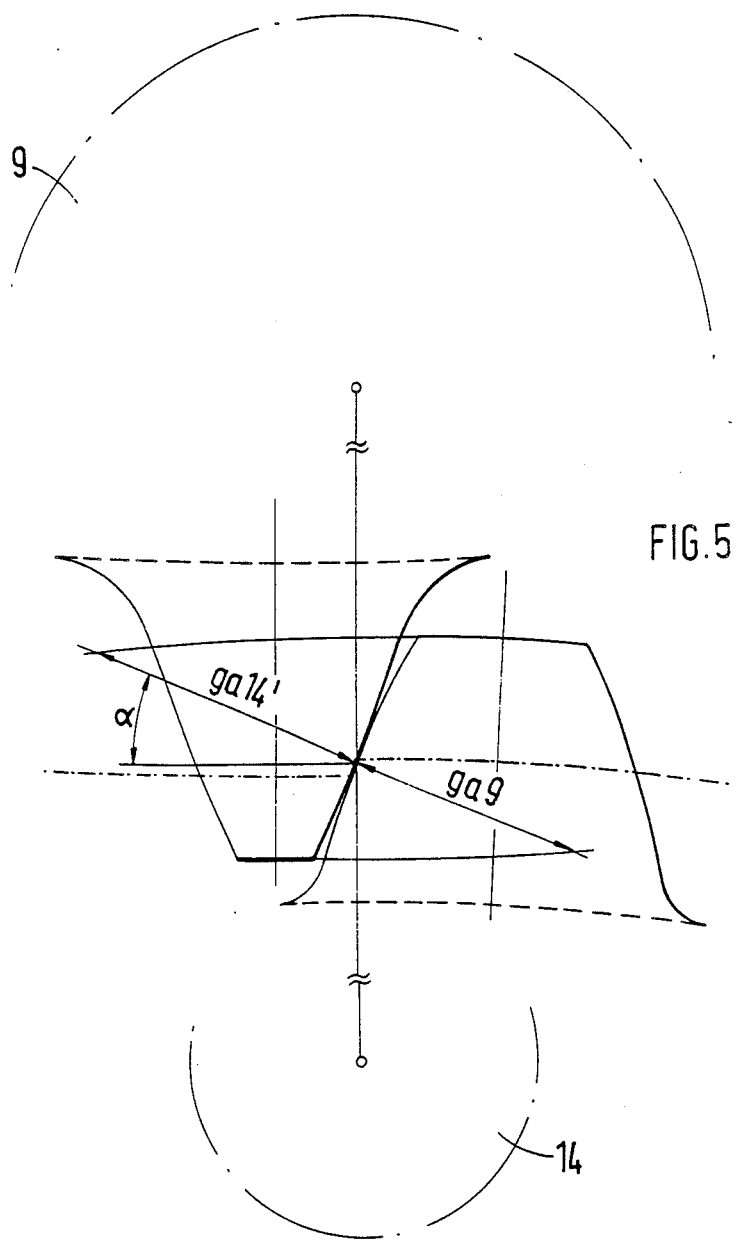

FOUR-WHEEL LOCKING SYSTEM FOR A MOTOR VEHICLE

BACKGROUND AND SUMMARY OF THE INVENTION

The present invention generally relates to a four-wheel locking system for a motor vehicle and more particularly to an arrangement to preventing locking of the system when the vehicle must start under a heavy load.

A four-wheel locking system is disclosed by German patent specification (DE-PS) 35 07 490 wherein a planetary transmission includes planet wheels disposed on a planet carrier mate with an input sun gear and an output sun gear which is coaxially arranged next to it and has a slightly lower number of teeth. This arrangement is possible by means of corresponding profile corrections of the gear wheels. The ratio for the direct drive-through of the input sun gear to the output sun gear deviates only slightly from 1:1; however, the gear wheel ratio of the input sun gear to the planet carrier is much higher, specifically 18:1. If a rotational speed difference occurs at the locking system, that is, between the input shaft and the output shaft, the planet carrier, corresponding to the high ratio, will rotate at a high rotational speed.

A braking device applied to the planet carrier of this arrangement therefore must generate only a slight braking torque in order to lock the planetary drive and thus transmit driving torque from one vehicle axle to the other vehicle axle. Occasionally, difficulties occurred when a motor vehicle having such a locking system must, for example, start on a hill under a high load. In the planetary transmission, this may result in a self-locking as a result of excessive friction losses, mainly in cases where normal cut gear wheels are used which have the conventional coefficients of roughness of approximately 1 $\mu$m.

It is an object of the present invention to provide gearings of a planetary gear system such that self-locking is avoided, without the requirement of costly manufacturing processes, such as the burnishing or lapping of the gear wheels.

In order to achieve these and other objects, the real pitch module (m) of all gear wheels is proportional to the driving torque to be transmitted and is dimensioned to be small and the operational pressure angle $\alpha$ is as large as possible. Thus, from the large number of parameters which influence the tooth friction losses, the real pitch module m is selected for an optimization. Corresponding to the driving torque to be transmitted, it is dimensioned as small as still acceptable with respect to strength. As a supplementary measure, in order to ensure sufficient root strength of the teeth and load capacity of the flanks despite the small module, the operational pressure angle $\alpha$ is selected to be as large as possible with respect to overriding constructive requirements.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic view of the planetary transmission of FIG. 2 as seen from the right;

FIG. 4 a schematic longitudinal sectional view of the planet wheel of FIGS. 2 and 3; and FIG. 5 is a view of the mating of a sun gear and a planet wheel in accordance with one embodiment of the present invention.

DETAILED DESCRIPTION OF THE DRAWINGS

Figure 1:
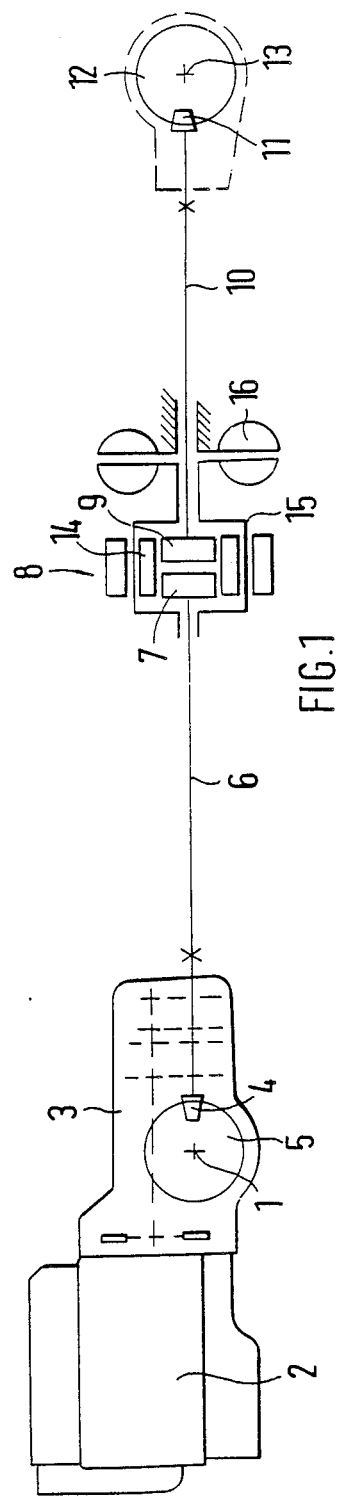
FIG. 1 is a longitudinal sectional view of a four-wheel locking system in the drive line of a motor vehicle in accordance with one embodiment of the present invention.

An embodiment of the invention is shown in the drawing and will be explained in the following.

A driving engine 2, which is arranged close to the front axle 1 on a motor vehicle directly drives the front axle 1 by way of a bevel gear 4 and a ring gear 5 by means of a gear shift transmission 3 mounted on it. A drive shaft 6 extends from the bevel wheel 4 to an input sun gear 7 of a planetary transmission 8. Coaxially to the input sun gear 7, an output sun gear 9 is disposed next to it, from which a drive shaft 10 leads to the bevel gear 11 which drives a ring gear 12 of the rear axle 13.

Planet wheels 14 mate with the input sun gear 7 and the output sun gear 9, these planet wheels 14 being arranged at a planet carrier 15 which is rigidly connected with the braking element of a hydrodynamic brake 16.

In order to keep the mechanical friction losses in the planetary transmission low and to avoid a self-locking of the planet wheel locking system when the vehicle is started under load conditions, the teeth of the sun gears 7, 9 and of the planet wheels 14 have a special construction. For two mating gear wheels with the numbers of teeth Z1 and Z2, the following known calculation formulas will generally apply:

$$P_{VZ} = P_a \cdot \mu_m \cdot H_v$$

wherein
$P_{VZ}$ = tooth friction power loss
$P_a$ = nominal driving power
$\mu_m$ = mean tooth friction number
$H_V$ = degree of tooth loss
$Z_1$ = number of teeth of 1st gear wheel
$Z_2$ = number of teeth of 2nd gear wheel $$H_V = \frac{\pi(u+1)}{Z_1 \cdot u \cdot \cos\beta_b} \cdot (1 - \epsilon_\alpha + \epsilon_1^2 + \epsilon_2^2)$$

$$\pi = 3,14$$

$$u = \frac{Z_1}{Z_2}$$

$\epsilon_\alpha$ = transverse contact ratio
$\epsilon_1$ = tip contact ratio at wheel 1
$\epsilon_2$ = tip contact ratio at wheel 2
$\beta_b$ = helix angle in base circle $$D = \frac{z \cdot m}{\cos\beta}$$

Figure 2:
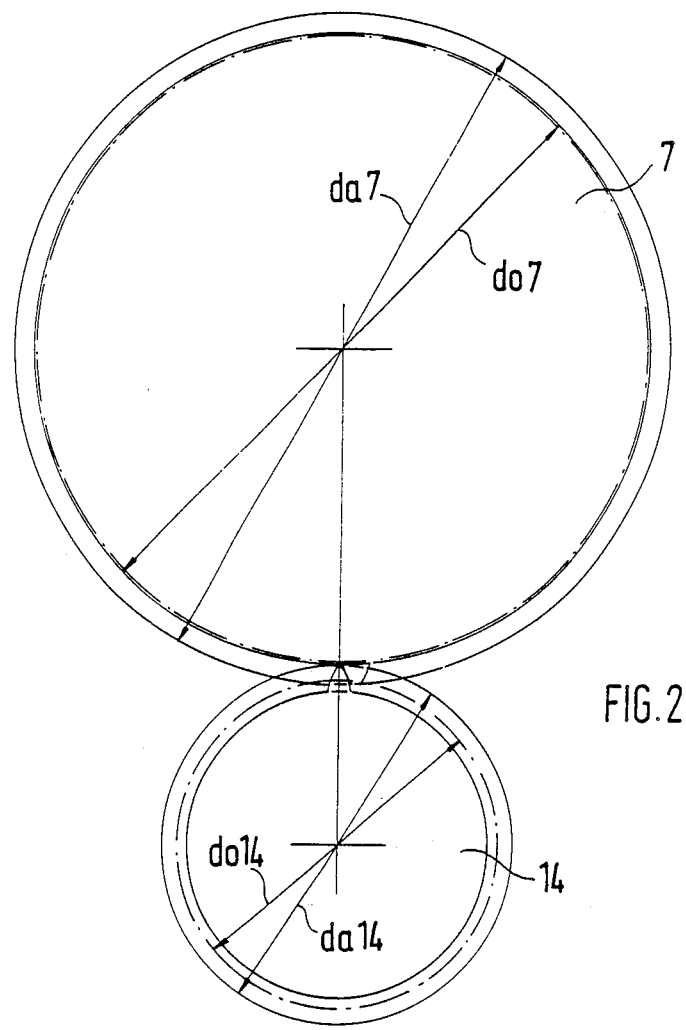
FIG. 2 is a schematic lateral view of a planetary transmission in accordance with an embodiment as seen from the left.

$D$ = reference diameter
$m$ = real pitch module
$z$ = number of teeth
$\beta$ = helix angle in reference circle With reference to FIG. 2, $d_{07}$ is the reference diameter of the sun gear 7, $d_{a7}$ is the outside or useful tip diameter of sun gear 7; $d_{014}$ is the reference diameter of planet wheel 14; and da14 is the outside or useful tip diameter of a portion of the planet wheel 14 in mating range and with sun gear 7 shown in FIG. 4. In FIG. 3, $d_{09}$ is the reference diameter of sun gear 9; $d_{a9}$ is the outside or useful tip diameter of sun gear; and da14' is the outside or useful tip diameter of a portion of the planet wheel 14 in mating range with sun gear 9 shown in FIG. 4. In FIG. 5, ga14' and ga 9 are crest contact sections of the planet wheel 14 and sun gear 9, respectively, defining an operational pressure angle, $\alpha$.

Although the tooth friction losses depend on many factors, it was found that a self-locking can be prevented most effectively by making the real pitch module as small as possible and the number of teeth as large as possible. In an embodiment of the present invention, the real pitch module $m=1.2$ mm; the number of teeth of the input sun gear 7, $z_7=59$ teeth; the number of teeth of the output sun gear 9, $Z_9=63$ teeth; the number of teeth of the planet wheels 14, $Z_{14}=31$ teeth. As the operational pressure angle, 23° was selected in one wheel pair and 28° was selected in the other wheel pair.

That a small real pitch module is desired for the design, is derived from the following relationships. In order to achieve a useful transverse contact ratio and thus an acceptable noise behavior, the operational transverse path of contact must be larger than the base pitch. On the other hand, the stress to the flanks, the rubbing speed and the power loss will increase with an enlarging transverse path of contact. Therefore, by means of a reduction of the real pitch module, while the durability limits are taken into account, the base pitch must be reduced to such an extent that an optimization is obtained with respect to the operation, the noise behavior and the durability.

The real pitch module m is selected corresponding to the driving torque to be transmitted at the motor vehicle. In the case of trucks, it may be up to 4.0 mm.

Since one planet wheel 14 mates with two sun gears 7 and 9 of a differing number of teeth, profile corrections or displacement x at the tooth flanks are required as well as adaptations of the addenda and of the dedenda for the wheel pairs. The profile correction $x_7$ at the input sun gear 7 amounts to $x_7=-1$. The profile correction at the output sun gear $x_9=+2$.

As shown in FIG. 4, the planet wheels 14 have a stepped construction. Their useful tip diameter da 14', in the mating range with the output sun gear 9, which has four more teeth than the input sun gear 7, is by 1.5 mm smaller than the useful tip diameter da 14 in the mating range with the input sun gear 7.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A four-wheel locking system in the drive line of a motor vehicle comprising:
   a planetary transmisson formed by an input sun gear driven by a motor vehicle transmission and an output sun gear which is disposed coaxially next to the input sun gear and connected with an axle to be driven and having a slightly larger number of teeth than the input sun gear, the planetary transmission further including planet wheels of a planet carrier which mate with the input and output sun gears; and
   braking means effecting a locking of rotational movement of the planet carrier, wherein a real pitch module of all gear wheels of the planetary transmission is proportional to a driving torque to be transmitted and is dimensioned to be between approximately 1.0 mm and 4.0 mm, and wherein an operational pressure angle is about 14° to 31°.

2. A locking system according to claim 1, wherein transverse paths of contact of gear tips are dimensioned such that approximately identical rubbing speeds occur at useful tip diameters of wheel pairs.

3. A locking system according to claim 1, wherein useful tip diameter of the planet wheels in the mating range with the sun gear having a larger number of teeth is approximately 1.5 mm smaller than the useful tip diameter in the mating range with the sun gear with a smaller number of teeth.

4. A locking system according to claim 1, wherein the real pitch module is approximately 1.0 mm for passenger cars.

5. A locking system according to claim 1, wherein the reap pitch module is approximately 4.0 mm for trucks.

* * * * *